(12) United States Patent
Liang et al.

(10) Patent No.: US 6,266,955 B1
(45) Date of Patent: Jul. 31, 2001

(54) DIAGNOSTIC SYSTEM FOR AN EMISSIONS CONTROL ON AN ENGINE

(75) Inventors: Cho Y. Liang, Peoria; Steven R. McCoy, Washington, both of IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 09/378,447

(22) Filed: Aug. 20, 1999

(51) Int. Cl.$^7$ .................................................. F01N 3/00
(52) U.S. Cl. .......................... 60/274; 60/286; 60/295; 60/301; 123/1 A; 423/239.1
(58) Field of Search .................. 60/286, 301, 295, 60/274; 423/239.1; 123/1 A

(56) References Cited

U.S. PATENT DOCUMENTS

| | | | |
|---|---|---|---|
| 4,223,642 | * 9/1980 | Okubo | 123/1 A |
| 4,403,473 | 9/1983 | Gladden | 60/274 |
| 4,854,123 | 8/1989 | Inoue | 60/274 |
| 5,021,227 | 6/1991 | Kobayashi et al. | 423/212 |
| 5,367,875 | * 11/1994 | Aboujaoude et al. | 60/286 |
| 5,404,841 | 4/1995 | Valentine | 123/25 E |
| 5,535,708 | 7/1996 | Valentine | 123/25 C |
| 5,540,047 | 7/1996 | Dahlheim et al. | 60/274 |
| 5,584,265 | * 12/1996 | Rao et al. | 60/286 |
| 5,605,042 | 2/1997 | Stutzenberger | 60/286 |
| 5,609,026 | 3/1997 | Berriman et al. | 60/286 |
| 5,628,186 | 5/1997 | Schmelz | 60/274 |
| 5,665,318 | 9/1997 | Rembold et al. | 422/177 |
| 5,709,080 | 1/1998 | Arora et al. | 60/274 |
| 5,791,139 | 8/1998 | Atago et al. | 60/274 |
| 5,809,774 | 9/1998 | Peter-Hoblyn | 60/274 |
| 5,813,224 | * 9/1998 | Rao et al. | 60/286 |
| 5,833,932 | 11/1998 | Schmelz | 422/180 |
| 6,063,350 | * 5/2000 | Tarabulski et al. | 423/239.1 |

FOREIGN PATENT DOCUMENTS

WO 99/49957 * 10/1999 (DE).
410089155A * 4/1998 (JP).
411223157A * 8/1999 (JP).

* cited by examiner

Primary Examiner—Thomas Denion
Assistant Examiner—Thai-Ba Trieu
(74) Attorney, Agent, or Firm—R. Carl Wilbur

(57) ABSTRACT

A selective catalytic reduction emissions control includes a $NO_x$-reducing reagent stored in a vessel. The system includes apparatus and a method for determining when the vessel is empty or when the vessel is filled with a substance other than an acceptable $NO_x$-reducing reagent.

13 Claims, 3 Drawing Sheets

DIAGNOSTIC SYSTEM FOR AN EMISSIONS CONTROL ON AN ENGINE

TECHNICAL FIELD

The present invention relates generally to the field of compression ignition engines, and more particularly to tamper resistant emissions controls on compression ignition engines.

BACKGROUND ART

Compression ignition engines provide advantages in fuel economy, but produce both $NO_x$ and particulates during normal operation. When primary measures (actions that affect the combustion process itself, e.g., exhaust gas recirculation and engine timing adjustments) are taken to reduce one, the other is usually increased. Thus, combustion conditions selected to reduce pollution from particulates and obtain good fuel economy tend to increase $NO_x$.

Current and proposed regulations challenge manufacturers to achieve good fuel economy and reduce particulates and $NO_x$. Lean-burn engines will be necessary to achieve the fuel economy objective, but the high concentrations of oxygen in the exhaust renders typical exhaust gas catalyst systems ineffective for reducing $NO_x$.

SCR (selective catalytic reduction) has been available for years in some contexts for reducing $NO_x$. Originally, SCR depended on the use of ammonia gas, which has safety problems associated with its storage and transport. Aqueous urea and solid reagents are safer, but were not initially practical for many SCR applications—particularly mobile $NO_x$ sources—due to the difficulty in converting them from solid or solution form to active gaseous species, typically $NH_3$ and HNCO radicals.

Because of the heightened awareness and concern with emissions, there was a need for a safe, economical and effective answer to the problems associated with SCR, particularly for mobile compression ignition engines. Where SCR catalysts had been employed to limit $NO_x$ emissions from compression ignition engines, one had to deal with either the dangers of ammonia leakage or using a urea solution or other reagent and risk fouling the catalysts under most conditions. In this regard, see R. J. Hulterman; A Selective Catalytic Reduction Of $NO_x$ from Compression ignition Engines Using Injection Of Urea; Ph.D. thesis, September 1995. Hulterman describes a number of technical challenges including clogging of atomizers, decomposition problems and system dynamics.

The first limited attempts to use urea SCR for compression ignition engines sometimes required the use of large pyrolization chambers or other devices following the point of urea introduction into the exhaust, as disclosed in U.S. Pat. No. 5,431,893, to Hug, et al. Equipment of this type highlights the known problems with urea.

Regardless of physical form, urea takes time to break down in hot exhaust gases and may cause nozzle plugging. To protect an SCR catalyst from fouling, Hug, et al., propose bulky equipment. In addition, that disclosure highlights the necessity of maintaining the urea solution at a temperature below 100° C. to prevent hydrolysis. They propose the use of moderate urea solution pressures when feeding the urea solution and find it necessary to have alternative means to introduce high-pressure air into the feed line when it becomes plugged. The nozzles employed by Hug, et al., are apparently capable of producing moderately-fine sprays, the dispersion of which is aided by auxiliary air, but the droplets are still large enough to require a large pyrolization channel. Moreover, they employ dilute solutions that require significant heating to simply evaporate the water.

In European Patent Specification 615,777 A1, there is described an apparatus that feeds solid urea into a channel containing exhaust gases, which are said to be hydrolyzed in the presence of a catalyst. For successful operation the disclosure indicates that it is necessary to employ a hydrolysis catalyst, compressed air for dispersion of fine solids, means for grinding the urea into fine solids and a coating to prevent urea prills from sticking together. The disclosure notes that if the inside of the catalyzer and the nozzle tip only were coated with the catalyst, corrosion and deposition occurred. Despite achieving the goal of removing water from the process, the specification introduces solid urea into the gas stream-possibly depositing urea on the SCR catalyst.

Some of the deficiencies associated with these prior art systems were addressed by the device disclosed in U.S. Pat. No. 5,809,775. That device employs solid reagent in an SCR system integrated with an engine and provides an improved process and apparatus for $NO_x$ reduction. The device includes a vessel with a solid $NO_x$-reducing reagent that generates ammonia gas when it is heated to a temperature above the pyrolysis temperature for the reagent. The device then introduces the ammonia gas into the exhaust gas at an exhaust gas temperature effective for selective catalytic reduction, and passes the exhaust gas containing the reactant gas through an SCR reactor.

As noted in the '775 patent, the temperature of the exhaust gas is preferably within the range of from about 180° to about 650° C. Urea is a preferred solid $NO_x$-reducing reagent, but the reagent can comprise a member selected from the group consisting of: ammelide; ammeline; ammonium carbonate; ammonium bicarbonate; ammonium carbamate; ammonium cyanate; ammonium salts of inorganic acids, including sulfuric acid and phosphoric acid; ammonium salts of organic acids, including formic and acetic acid; biuret; cyanuric acid; isocyanic acid; melamine; tricyanourea; amines and their salts (especially their carbonates), including guanidine, guanidine carbonate, methyl amine carbonate, ethyl amine carbonate, dimethyl amine carbonate, hexamethylaminetetramine and hexamethylaminetetramine carbonate.

Each of the above $NO_x$-reducing reagents, or combination of them, will have a preferred temperature for pyrolysis. Some like ammonium carbonate, ammonium bicarbonate, and ammonium carbamate, are converted easily with relatively mild heating, e.g., as low as 40° C. The conversion of these materials is quantitative to ammonia gas and carbon dioxide. Others of the $NO_x$-reducing reagents are "urea-related materials" (ammelide, ammeline, ammonium cyanate, biuret, cyanuric acid, isocyanic acid, melamine, tricyanourea, urea, and mixtures of any number of these) and do not decompose easily and yield HNCO in addition to ammonia as active reagent gases. Yet others, do not form HNCO, but decompose to a mixture of gases including hydrocarbons. Among this group are various amines and their salts (especially their carbonates), including guanidine, guanidine carbonate, methyl amine carbonate, ethyl amine carbonate, dimethyl amine carbonate, hexamethylaminetetramine and hexamethylaminetetramine carbonate. Amines with higher alkyls can be employed to the extent that the hydrocarbon components released do not interfere with the $NO_x$-reduction reaction.

As further noted in the '775 patent, it is preferred that, for the group of urea and other urea-related materials, the solid $NO_x$-reducing reagent be heated to a temperature of at least about 300° C. and is maintained at a temperature at least about as high until introduced into the exhaust gas. Positive pressure or vacuum can be applied during heating the $NO_x$-reducing reagent. Conveniently, the reagent is maintained under a pressure of at least about 50 psi during heating to assist with injection of the reactant gas.

While the prior art systems generally perform acceptably while there is $NO_x$-reducing reagent present in the vessel, the prior art systems do not reduce $NO_x$ emissions when the vessel is empty or when the vessel is filled with a substance other than an acceptable $NO_x$-reducing reagent. It would be preferable to have an SCR system that is integrated with an engine, that provides an improved process and apparatus for $NO_x$ reduction while better insuring that there is appropriate $NO_x$-reducing reagent present in the vessel.

DISCLOSURE OF THE INVENTION

The present invention relates to an electronic control system for a compression ignition engine having an exhaust output. The system includes a vessel for storing a solid ammonia producing reagent; a sublimation sensor associated with said vessel and producing a sublimation signal; a valve in fluid communication with said vessel and said exhaust output; and a controller associated with said engine and controlling operation of the engine, said controller being connected with said valve and said sublimation sensor and modifying engine operation in response to said sublimation signal.

In another aspect of the invention, a method for inhibiting tampering with an emissions system on a compression ignition engine is disclosed. The emissions system preferably includes a vessel having an solid ammonia producing reagent stored therein, said vessel being connected with an exhaust path of said engine, wherein said ammonia is introduced into the exhaust stream and the mixture of ammonia and exhaust runs through an SCR catalyst. The method includes determining a temperature of said vessel; determining a pressure of said vessel; comparing said temperature and pressure to a sublimation curve for a the desired solid ammonia producing reagent; and modifying operation of the engine in response to said comparison.

Other aspects and advantages of the present invention will be apparent to those skilled in the art upon reading the following detailed description in connection with the drawings and appended claims.

BRIEF DESCRIPTION OF THE DRAWINGS

The invention will be better understood and its advantages more apparent from the following detailed description, especially when read in light of the accompanying drawings, wherein.

BEST MODE FOR CARRYING OUT THE INVENTION

The process and apparatus disclosed and claimed herein is effective with urea, but can also utilize other solid $NO_x$-reducing reagents capable of generating a reactant gas containing ammonia upon heating. These substances will be referred to as solid $NO_x$-reducing reagents or as solid ammonia producing reagents. As will be clear from the following, when certain of these solid reagents are pyrolyzed, the reactant gas will also contain HNCO unless sufficient water is contacted with it to convert the HNCO to ammonia and carbon dioxide.

Among the solid $NO_x$-reducing reagents that may be used in connection with the present invention are those that comprise a member selected from the group consisting of: ammelide; ammeline; ammonium carbonate; ammonium bicarbonate; ammonium carbamate; ammonium cyanate; ammonium salts of inorganic acids, including sulfuric acid and phosphoric acid; ammonium salts of organic acids, including formic and acetic acid; biuret; cyanuric acid; isocyanic acid; melamine; tricyanourea and mixtures of any number of these. The term "urea-related $NO_x$-reducing reagent" is meant to include the solid reagents that, like urea, form HNCO when heated. Among this group are: ammelide, ammeline, ammonium cyanate, biuret, cyanuric acid, isocyanic acid, melamine, tricyanourea, urea and mixtures of any number of these. The term "urea" is meant to encompass urea in all of its commercial forms. Typically, commercial forms of urea will consist essentially of urea, containing 95% or more urea by weight.

Yet other solid $NO_x$-reducing reagents are available that do not form HNCO, but decompose to a mixture of gases including hydrocarbons. Among this group are various amines and their salts (especially their carbonates), including guanidine, guanidine carbonate, methyl amine carbonate, ethyl amine carbonate, dimethyl amine carbonate, hexamethylamine and hexamethylamine carbonate. Amines with higher alkyls can be employed to the extent that the hydrocarbon components released do not interfere with the $NO_x$-reduction reaction.

Figure 1:
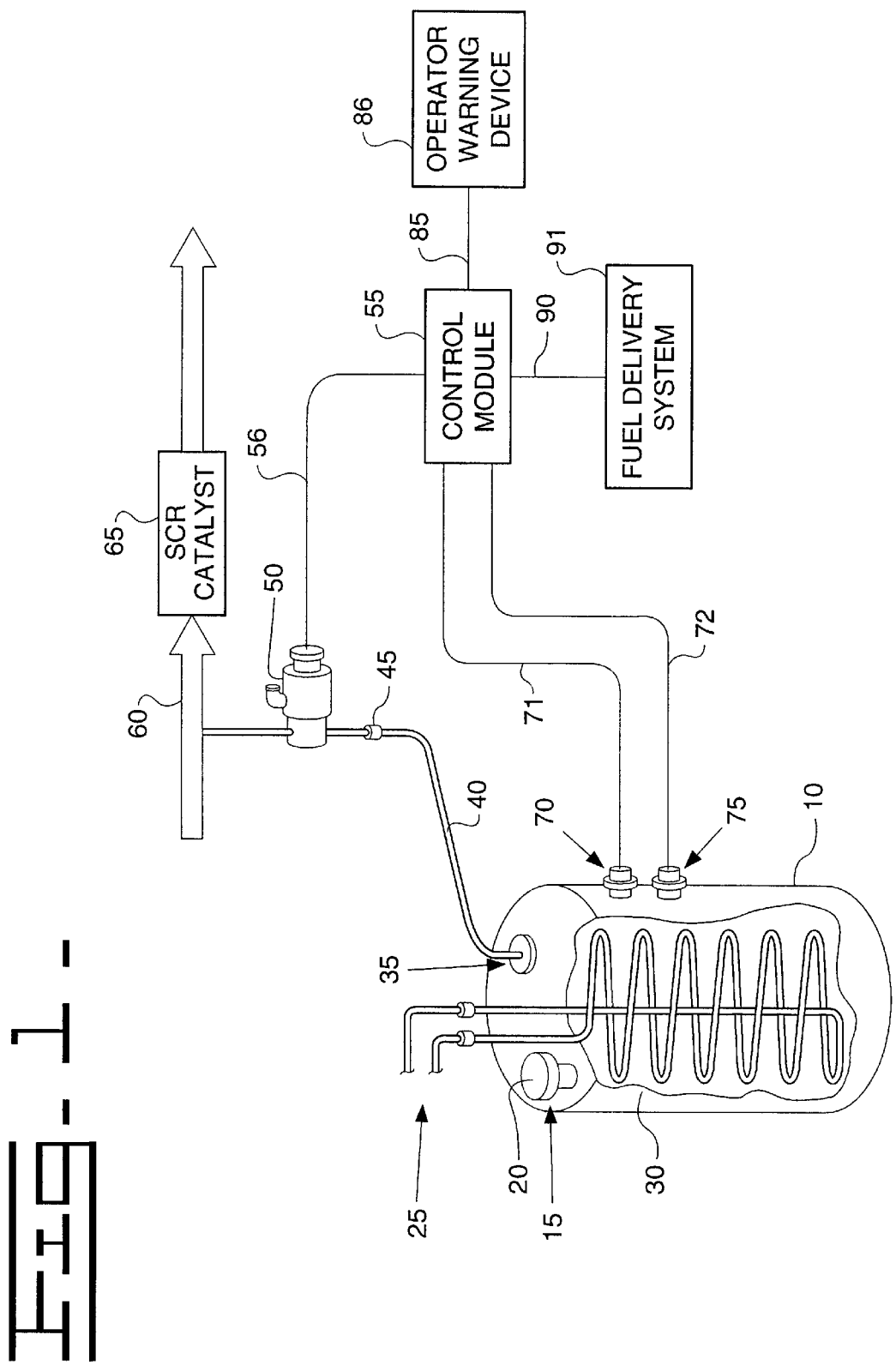
FIG. 1 is a system level block diagram of a preferred embodiment of one aspect of the invention.

Referring first to FIG. 1, a system level block diagram of a preferred embodiment of the invention is shown. As shown in FIG. 1, a solid urea or solid nitrogenous $NO_x$-reducing reagents are used to produce ammonia for SCR $NO_x$ reduction in a manner that avoids wetting or forming solid deposits on the catalyst or forming deposits that can plug the feed system, particularly valves and injectors. The advantages related to preventing the catalyst from being wet or having deposits form on it, are achieved by introducing the urea or other solid reagent into a vessel where it is heated to gasify it—primarily by pyrolysis.

As shown in the figure, a vessel 10 is provided for storing the solid ammonia producing reagent. Included in the vessel is a reagent fill port 15, which in a preferred embodiment includes a threaded hole that is closed with a threaded plug 20. Included in the vessel 10 is a heating device 25, which in a preferred embodiment is a resistive element that generates heat when electrical current is passed through the element, or is a conduit for engine coolant. The specific form of the heating device 25 will depend on the pyrolysis temperature of the reagent. As shown in the figure, the heating device 25 preferably is installed so that at least a portion of the element is within the interior of the vessel 10. However, in other embodiments, the heating device 25 may be outside the heating vessel. In those embodiments the vessel will conduct the heat generated by the heating device 25 and thereby heat the solid ammonia producing reagent.

The heating device 25 is controllably connected to a power source (not shown) to thereby control the amount of heat generated by the heating device 25. A vessel temperature sensor 70 and a vessel pressure sensor 75 are associated with the vessel 10 and provide a signal indicative of the temperature and pressure within the vessel 10 to a controller 55 over electrical connectors 71, 72 respectively. The vessel 10 also includes a port 35 that permits ammonia gas generated by heating the solid ammonia producing reagent (described more fully below) to pass out of the vessel 10 through a conduit 40.

Ammonia gas is generated in the vessel 10 by applying heat to the solid ammonia producing reagent. As heat is applied to the reagent the solid reagent sublimates producing ammonia gas and also causing the pressure in the vessel to increase. The pressure within the vessel 10 is maintained at or below a desired level through the use of a pressure regulator 45. Typically, the ammonia gas will be generated at an elevated pressure, conveniently greater than about 50 psi to assist in feeding the resulting reagent gas through the conduit 40. The temperature in the heating unit is preferably maintained high enough to assure pyrolysis. This causes ammonia gas to begin flowing through conduit 40 to pressure regulating valve 45. The pressure regulating valve 45 preferably controls the pressure of ammonia gas exiting the valve 45 to a desired level, which depends on the specific design characteristics of a control valve 50.

To achieve the goal of pyrolysis for a solid "urea-related" ammonia producing reagent, temperatures above about 300° C. are preferably employed for heating. The temperature of the gases produced by pyrolyzing ammonia producing reagents should preferably be maintained at a level that prevents their condensation. Typically, the temperature should be maintained at a temperature at least 300° C., and preferably at least 400° C. A preferred temperature range for the heating unit and for transfer of the gases produced by the noted group of reagents, is from about 450° to about 500° C. Pressure in the heating unit should be sufficient to enable uniform metering at the temperature selected, typically being within the range of from about 50 psi up to about 100 psi.

More moderate temperatures, e.g., above about 40° C., and typically from about 60° to about 300° C., can be employed to gasify the other solid ammonia producing reagents, namely: ammonium carbonate (60° C.); ammonium bicarbonate (60° C.); ammonium carbamate (60° C.); ammonium salts of inorganic acids, including sulfuric acid (280° C.) and phosphoric acid (155° C.); and ammonium salts of organic acids, including formic and acetic acid (190° C.). Because gasification of these materials does not produce HNCO (isocyanic acid, also sometimes called cyanic acid: HNCO), there is no need to maintain the high temperature to prevent condensation, Yet others, do not form HNCO, but decompose to a mixture of gases including hydrocarbons. Among this group are various amines and their salts (especially their carbonates), including guanidine, guanidine carbonate, methyl amine carbonate, ethyl amine carbonate, dimethyl amine carbonate, hexamethylamine and hexamethylamine carbonate. Amines with higher alkyls can be employed to the extent that the hydrocarbon components released do not interfere with the $NO_x$-reduction reaction.

It is possible to provide a catalyst suitable for aiding the pyrolysis of the urea. Among the suitable pyrolysis catalysts are ones that comprise a material selected from the group consisting of platinum group metals, such as palladium and platinum, stainless steel, and the oxides of vanadium, chromium, titanium, molybdenum and nickel, and mixtures of two or more of these. The pyrolysis catalyst preferably comprises one of these materials in a foraminous configuration, e.g., a form selected from the group consisting of wire mesh, sintered metal, sheet metal with mechanically formed holes, zeolite, alumina, ceramic, beads, honeycomb structures, rings and saddles. These or other materials can be impregnated or coated with catalytic material.

At the indicated temperatures and pressures, the urea or other solid urea-related $NO_x$-reducing reagent will be pyrolyzed to produce a reactant gas containing a mixture of ammonia and HNCO. It can be advantageous where the added equipment is justified economically, to employ a separate reactor wherein HNCO is reacted with water vapor (as steam or combustion gases) to convert all of the active nitrogen reagents to ammonia. Typically, this reaction will have a stoichiometry calling for one mole of water (as steam) for each mole of HNCO, and will be effective at pressures and temperature on the order of those described.

Returning to FIG. 1, the gas mixture including ammonia that is generated in the vessel 10 travels through the port 35, conduit 40 and pressure regulator 45 to a control valve 50. The control valve is preferably connected with a control module 55 which produces a valve control signal on an electrical connector 56 to control the opening and closing of the control valve 50. In this manner, the control module 55 can control the amount of gas mixture introduced into the exhaust gas stream 60 by controlling the opening and closing of the control valve 50. The exhaust gas and ammonia gas mixture then flows though an SCR catalyst 65. The SCR catalyst operates in a manner known to those skilled in the art to reduce the $NO_x$ emissions in the exhaust as.

The controller 55 of FIG. 1 is also preferably connected with an operator warning device 86 that can comprise one of many known such devices including visual or audible alarms. The operator warning device 86 is connected with the controller 55 through an electric connector 85. The controller 55 activates the operator warning device 86 by applying an appropriate electrical signal to the electrical connector 85. The controller 55 is also connected with a fuel delivery system 91 through electrical connectors 90. The fuel delivery system 91 preferably includes fuel injectors associated with cylinders of the engine and control, among other things, the duration and timing of fuel injected into an engine cylinder based on a control signal produced by the controller 55. Although a preferred embodiment uses fuel injectors, the present invention is equally applicable to other fuel delivery systems, including carburetors. Various methods for generating the ammonia gas mixture and controlling the introduction of that mixture into the exhaust gas stream are known in the art. One such method is described in U.S. Pat. No. 5,809,775.

The SCR catalyst system described above and those known in the art are generally able to reduce the $NO_x$ emissions so long as there is an appropriate solid ammonia producing reagent present in the vessel 10. However, prior art systems are unable to determine when the solid ammonia producing reagent in the vessel has been depleted. Furthermore, there is nothing in the prior art that would prevent an operator from filling the vessel with a less expensive solid, but one that does not produce ammonia. In such systems the operator could simply allow the reagent to run out and not re-fill the vessel with reagent or refill the vessel with a substance that is less expensive than the ammonia producing reagent, but one that is not effective in reducing the $NO_x$ emissions when introduced into the exhaust stream.

Figure 2:
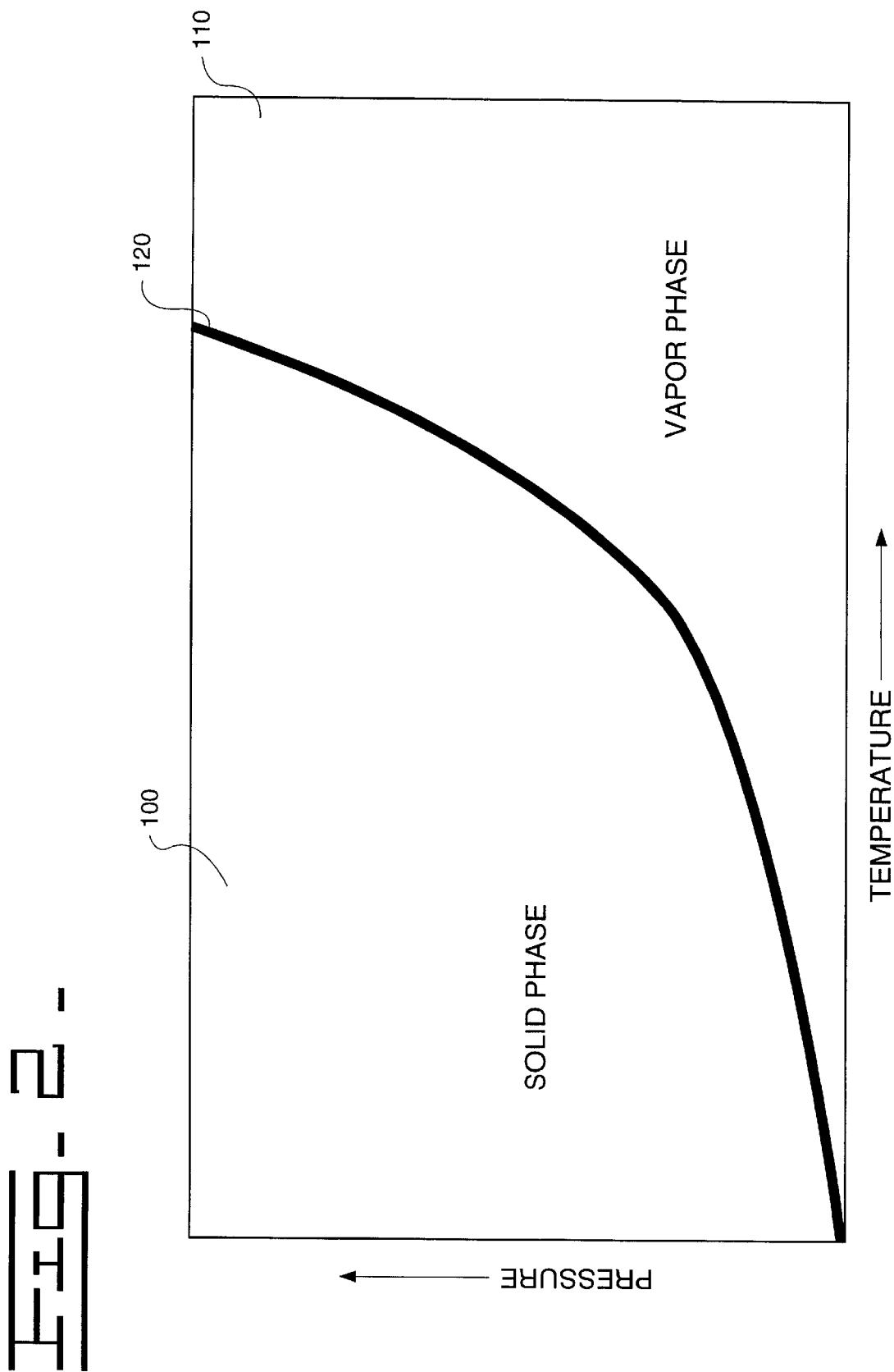
FIG. 2 is a representative sublimation curve of a solid ammonia producing reagent.

Turning now to FIG. 2, a generic sublimation curve is shown. The curve of FIG. 2 is generally the form of a sublimation curve 120 for an appropriate solid ammonia producing reagent that can be used in connection with the present invention. A first area 100 above and to the left of the sublimation curve 120 represents temperatures and pressures for which the solid ammonia producing reagent will remain in solid form; i.e. no ammonia gas mixture will be produced in the vessel 10. A second area 110 below and to the right of the sublimation curve 120 represents temperatures and pressures for which the ammonia producing reagent will be entirely in gas form. Obviously, it is desirable for the solid ammonia producing reagent to slowly sublimate from solid to gas. This occurs, when there is both solid and gas present in the vessel 10, i.e., when the temperature and pressure correspond to about the same temperatures and pressures of the sublimation curve 120. As described more fully below, with reference to FIG. 3, by using a sensor or sensors to determine whether the substance in the vessel is in both solid and gas form, the electronic controller can determine whether the desired solid ammonia producing reagent is present in the vessel. In a preferred embodiment, the electronic controller inputs signals indicative of the temperature and pressure in the vessel 10 and compares those values to data values corresponding to the sublimation curve 120 to determine whether there is the desired solid ammonia producing reagent in the vessel.

Figure 3:
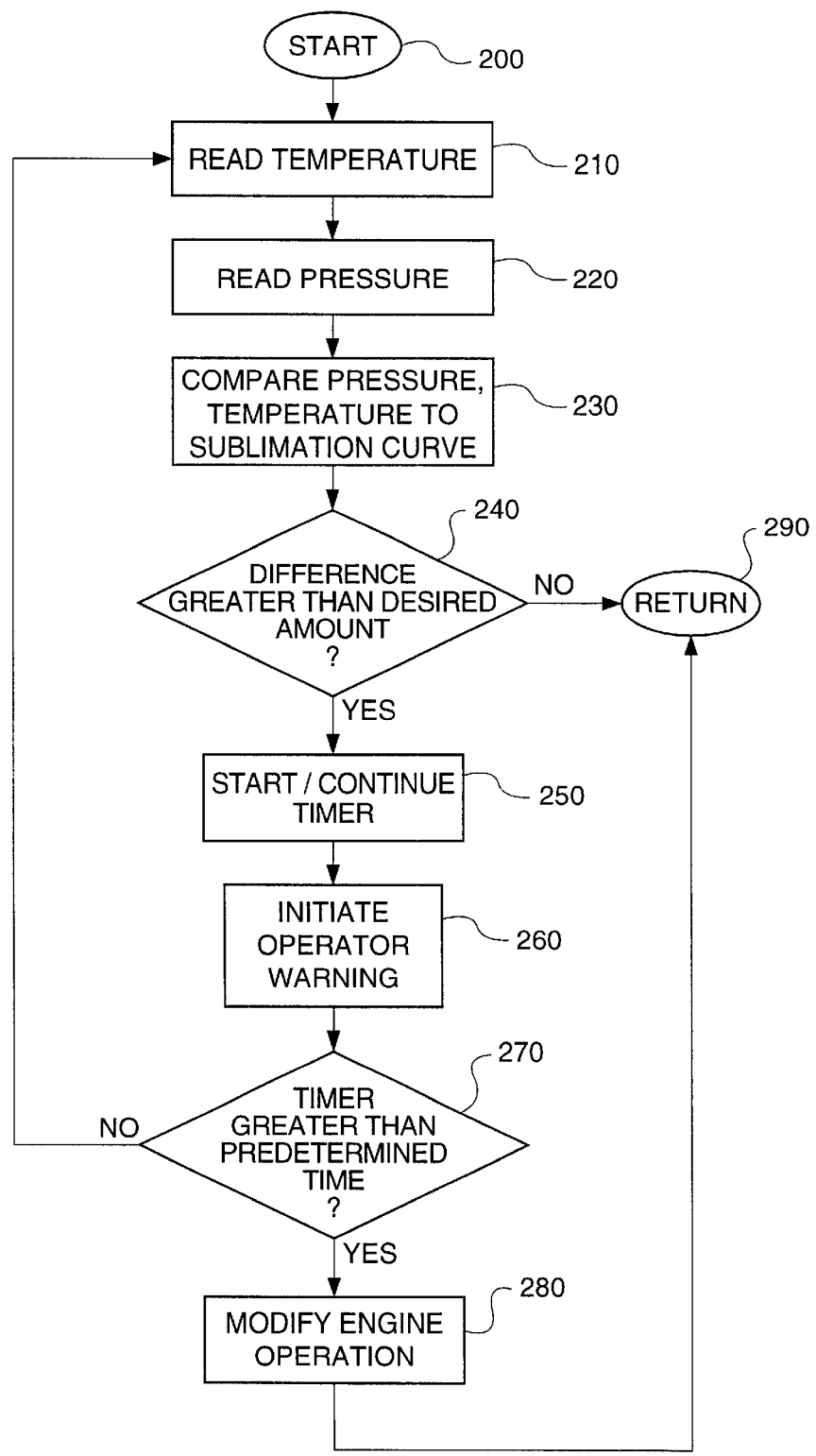
FIG. 3 shows a flowchart of the software control employed in connection with a preferred embodiment of the present invention

Referring now to FIG. 3, a flowchart of software implemented in a preferred embodiment of the present invention is disclosed. Those skilled in the art can readily and easily develop the specific software code necessary to implement the flowchart by using the specific instruction set associated with the microprocessor or microcontroller selected for use with the present invention.

In block 200, program control begins. Program control then passes to block 210.

In block 210, the controller 55 inputs the vessel temperature signal produced by the temperature sensor 70 and calculates a vessel temperature. Program control then passes to block 220.

In block 220, the controller 55 inputs the vessel pressure signal produced by the vessel pressure sensor 75 and calculates a vessel pressure. Program control then passes to block 230.

In block 230, the controller 55 compares the temperature and pressure values to data values representing the sublimation curve 120 and calculates a difference between the measured temperature and pressure values and the closest data values on the sublimation curve 120. Those skilled in the art will recognize that there are many suitable methods for calculating such a difference. It should be recognized that any such method can be readily and easily used in connection with an embodiment of the invention without deviating from the scope of the present invention as defined by the appended claims. Program control then passes to block 240.

In block 240, the controller 55 compares the difference calculated in block 230 to a predetermined value. If the calculated difference is greater than the predetermined value, then program control passes to block 250, otherwise program control passes to block 290 where the program ends and control is returned to the calling program.

In block 250, the controller 55 starts a timer (or continues running the timer if it had already been started). Program control then passes to block 260.

In block 260, the controller 55 initiates an operator warning by transmitting an operator warning signal over electrical connector 85 to an operator warning device 86. Program control then passes to block 270.

In block 270, the controller 55 determines whether the timer value initiated in block 250 has exceeded a predetermined time period. If the time value has exceeded the predetermined time period, then program control passes to block 280, otherwise program control passes to block 210 where a new temperature value is read.

In block 280, the controller 55 modifies operation of the engine. In a preferred embodiment, this modification includes derating the power output of the engine. From block 280, program control passes to block 290, where control returns to the calling program.

INDUSTRIAL APPLICABILITY

It is more expensive to run a compression ignition engine with a solid ammonia producing reagent and SCR system then it is to run a compression ignition engine without such a system. One recurring additional cost is the purchase of the solid ammonia producing reagent, which is depleted as the engine runs and must be replenished. Unscrupulous vehicle operators might attempt to circumvent the SCR system used on an engine to reduce operating costs, but at the expense of increased emissions. One way an operator might do this is to allow the solid reagent to run out and simply not re-fill the vessel 10. Another way might be to fill the vessel with a substance that does not produce the desired gas mixture to complete the SCR reaction.

An embodiment of the present invention, compares temperature and pressure readings in the vessel 10 to data values corresponding to a sublimation curve 120 for the substance which is supposed to be in the vessel. If the pressure is too high for a particular temperature, then the controller will determine that a substance other than the desired substance is in the vessel. Likewise if the pressure is too low for a particular temperature, then the controller will determine that the vessel has either run out of the desired substance or the operator has filled the vessel with something other than the desired substance. In either event, the controller 55 will first cause the operator warning device 86 to warn the operator. If the operator does not correct the problem with a predetermined time period, then the controller 55 modifies operation of the engine, which in a preferred embodiment includes de-rating the output power of the engine.

By using an embodiment of the present invention, the operator is less likely to be able to defeat the $NO_x$ reducing capabilities of an SCR system using a solid ammonia producing reagent.

What is claimed is:

1. An electronic control system for a compression ignition engine having an exhaust output, said control system comprising:

a vessel for storing a solid ammonia producing reagent;

a sublimation sensor associated with said vessel and producing a sublimation signal;

a valve in fluid communication with said vessel and said exhaust output;

a controller associated with said engine and controlling operation of the engine, said controller being connected with said valve and said sublimation sensor and modifying engine operation in response to said sublimation signal; and data representing at least one sublimation curve stored in said controller, said sublimation curve corresponding to a solid ammonia producing agent;

wherein said sublimation sensor includes:

a temperature sensor; and a pressure sensor;

wherein said sublimation signal includes:

a temperature signal produced by said temperature sensor; and a pressure signal produced by said pressure sensor b.

2. The electronic control system according to claim 1, wherein said controller determines a vessel temperature and pressure as a function of said vessel temperature and pressure signals and compares said vessel temperature and pressure to data representing said sublimation.

3. The electronic control system according to claim 2, wherein said controller modifies operation of the engine in response to said temperature and pressure signals being greater than a desired difference from said sublimation curve.

4. The electronic control system according to claim 2, wherein said controller modifies operation of the engine in response to said temperature and pressure signals being greater than a desired difference from said sublimation curve for more than a predetermined length of time.

5. The electronic control system according to claim 3, wherein said modification of the operation of the engine includes de-rating the power output of said engine.

6. The electronic control system according to claim 4, wherein said modification of the operation of the engine includes de-rating the power output of said engine.

7. An emissions control system for reducing $NO_x$ emissions from exhaust of a compression ignition engine, said exhaust being passed through an SCR reactor effective for selective catalytic $NO_x$ reduction, comprising:

an electronic controller associated with said engine for controlling fuel delivery to said engine;

a vessel including a solid ammonia producing reagent;

a heat source associated with said vessel to apply heat to said reagent;

a valve in fluid communication with said vessel and an exhaust path of said engine, said valve controllably introducing ammonia produced by said reagent into said exhaust path;

a temperature sensor associated with said vessel and producing a vessel temperature signal;

a pressure sensor associated with said vessel and producing a vessel pressure signal; and data representing a sublimation curve stored in said electronic controller; and wherein said electronic controller receives said vessel temperature and pressure signals and modifies said fuel delivery as a function of said vessel temperature and pressure signals; and wherein said electronic controller compares said vessel temperature and pressure signals to at least a portion of said data and modifies said fuel delivery as a function of said comparison.

8. The emissions control system according to claim 7, including:

data representing a sublimation curve stored in said electronic controller; and wherein said electronic controller compares said vessel temperature and pressure signals to at least a portion of said data and modifies said fuel delivery in response to said vessel temperature and pressure signals differing from said data by more than a predetermined amount for greater than a predetermined period of time.

9. The emissions control system according to claim 7, including:

an operator warning device operable to emit an operator warning when activated, said operator warning device being connected with said electronic controller;

data representing a sublimation curve stored in said electronic controller; and wherein said electronic controller compares said vessel temperature and pressure signals to at least a portion of said data, activates said operator warning device in response to said vessel temperature and pressure signals differing from said data by more than a predetermined amount, and modifies said fuel delivery in response to said vessel temperature and pressure signals differing from said data by more than a predetermined amount for greater than a predetermined period of time.

10. The emissions control system according to claim 9, wherein said electronic controller modifying said fuel delivery includes modifying the fuel delivery to decrease the power output of said engine.

11. A method for inhibiting tampering with an emissions system on a compression ignition engine, said emissions system including a vessel having a solid ammonia producing reagent stored therein, said vessel being connected with an exhaust path of said engine, wherein said ammonia is introduced into the exhaust stream and the mixture of ammonia and exhaust runs through an SCR catalyst, said method comprising:

determining a temperature of said vessel;

determining a pressure of said vessel;

comparing said temperature and pressure to a sublimation curve for the desired solid ammonia producing reagent; and modifying operation of the engine in response to said comparison.

12. The method according to claim 11, wherein said step of modifying includes the step of derating the output power of the engine.

13. The method according to claim 11, wherein said step of modifying comprises derating the output power of the engine if the temperature and pressure signals differ from the sublimation curve by more than a predetermined amount for more than a predetermined time period.

* * * * *